United States Patent [19]
Cai et al.

[11] Patent Number: 5,580,909
[45] Date of Patent: Dec. 3, 1996

[54] STABLE WATER-EXTENDED POLYETHERESTER EMULSIONS

[75] Inventors: Gangfeng Cai, West Chester; Shau-Hua Guo, West Goshen, both of Pa.; Lau S. Yang, Wilmington, Del.

[73] Assignee: ARCO Chemical Technology L.P., Greenville, Del.

[21] Appl. No.: 436,539

[22] Filed: May 8, 1995

[51] Int. Cl.$^6$ ............................... C08L 67/06; C08L 71/00
[52] U.S. Cl. ........................... 523/501; 523/502; 524/801
[58] Field of Search ..................... 523/502, 501; 524/801; 528/274, 275, 287

[56] References Cited

U.S. PATENT DOCUMENTS

| | | | |
|---|---|---|---|
| 3,244,772 | 4/1966 | von Bonin et al. | 525/11 |
| 3,256,219 | 6/1966 | Will | 521/62 |
| 3,442,842 | 5/1969 | von Bonin | 524/591 |
| 3,779,966 | 12/1973 | Weeks et al. | 523/502 |
| 3,822,224 | 7/1974 | Gillan et al. | 523/502 |
| 3,975,348 | 8/1976 | Christena | 523/502 |
| 3,988,272 | 10/1976 | Watts et al. | 523/502 |
| 4,077,931 | 3/1978 | Leitheiser et al. | 523/502 |
| 4,284,547 | 8/1981 | Sulick | 523/502 |
| 4,358,476 | 11/1982 | Zimmer et al. | 427/494 |
| 4,775,502 | 10/1988 | Chafvin, Jr. | 264/41 |
| 5,319,006 | 6/1994 | Yang et al. | 523/500 |
| 5,436,313 | 7/1995 | Klang et al. | 528/274 |
| 5,436,314 | 7/1995 | Yang et al. | 528/274 |

OTHER PUBLICATIONS

"Water–Extended Polyesters", R. E. Carpenter, Ency. Polym. Sci. Eng. 12, 290, p. 11, paragraph 4, 1989.

*Primary Examiner*—Tae Yoon
*Attorney, Agent, or Firm*—Jonathan L. Schuchardt

[57] ABSTRACT

Stable emulsions based on unsaturated polyetherester resins are disclosed. The emulsions have high stability compared with conventional emulsions that are based on unsaturated polyester resins. The invention includes base-stabilized emulsions, as well as emulsions containing fillers or functional additives. The emulsions, which are storage stable for weeks or months, are useful for making water-extended polyetherester thermosets having excellent physical properties, even at high water contents.

19 Claims, No Drawings

STABLE WATER-EXTENDED POLYETHERESTER EMULSIONS

FIELD OF THE INVENTION

The invention relates to water-extended polymer emulsions. In particular, the invention relates to water-extended polyetherester emulsions that have unusually good stability and are useful for making water-filled polyetherester thermosets.

BACKGROUND OF THE INVENTION

Water-extended polyester emulsions are used to make cured thermoset castings that are actually microcellular water-filled foams. The thermosets are useful as plaster replacements because of their high impact and tensile strengths. Water-extended polyester emulsions are ideal for reproducing intricate pieces of art because the emulsion flows easily into complex molds and gives cured products that resist breakage. Because water acts as a heat sink, thick articles with complicated shapes can be easily cast quickly and cured without overheating problems.

A water-in-resin emulsion is typically formed by adding water slowly to a polyester resin with high-shear stirring to form a continuous phase of polyester that contains, emulsified within the continuous phase, small water droplets (average diameter about 2–6 microns). The low-viscosity emulsion is poured into a mold and is cured with a catalyst system comprising a free-radical initiator and a transition-metal catalyst to produce the thermoset product. The thermoset product consists of a solid plastic continuous phase with water-filled cells as the discontinuous phase.

Emulsion stability is an important concern in preparing water-extended polyester emulsions. Even a properly made water-extended polyester emulsion typically remains stable for only a few hours. Because emulsion stabilities are so low, fabricators of water-extended polyester thermoset products normally purchase polyester resins and make their own emulsions. Thus, purveyors of the thermosets must normally purchase expensive, sophisticated mixing equipment and acquire expertise in formulating the emulsions from the polyester resins.

One approach to formulating more stable polyester emulsions is to use polyester resins of relatively high molecular weight. Coupling agents, such as diisocyanates, are sometimes used to link polyester chains together to improve emulsion stability (see, e.g., U.S. Pat. No. 4,077,931). Although polyesters with higher molecular weights can give stabler emulsions, they also generally have higher viscosities. High resin viscosity can be a disadvantage in making the thermosets because excess air entrapment can occur, resulting in products with unwanted voids.

Commercial water-extended polyesters give thermosets with tensile and flex properties that make them suitable for casting and decorative arts applications. Generally, formulators strike a balance between the level of properties needed and cost. Tensile and flex properties generally diminish steadily as the amount of water is increased. An improved emulsion would give thermosets having a high level of physical properties even at high water levels.

Improved water-extended polymer emulsions are needed. In particular, emulsions with improved stability relative to commercial polyester emulsions would offer substantial advantages. The availability of a stable emulsion would enable a manufacturer of water-extended thermoset products to eliminate the need to purchase expensive mixers and to acquire formulating expertise; instead, he or she could simply purchase the emulsion. Ideally, the emulsion could be stabilized without substantially increasing its viscosity.

Improved water-extended thermosets are also desirable. Preferred thermosets would have good physical properties over a wide range of water contents, particularly at high water levels.

SUMMARY OF THE INVENTION

The invention is a stable water-in-resin emulsion comprising a continuous phase and water droplets emulsified within the continuous phase. The continuous phase includes from about 20 to about 80 wt. % of a vinyl monomer, and from about 20 to about 80 wt. % of an unsaturated polyetherester resin, both amounts based on the amount of continuous phase. The water droplets comprise from about 20 to about 70 wt. % of the emulsion.

We surprisingly found that a water-in-resin emulsion that uses an unsaturated polyetherester resin as a continuous phase imparts excellent stability to the emulsions compared with emulsions made using conventional polyester resins. While water-extended polyester emulsions are usually stable for only a few hours, the water-extended polyetherester emulsions of the invention are often stable for months. The improved stability allows formulators of thermoset products to purchase emulsions instead of resins, and to avoid the costs of making the emulsions themselves. The polyetherester emulsions of the invention have improved stabilities, but low viscosities; the emulsions of the invention avoid the air-entrapment problems that often plague high-molecular-weight polyester emulsions.

Finally, the emulsions of the invention give water-extended thermoset products having good physical properties over a wide range of water contents, and improved properties compared with commercially available water-extended polyester emulsions. The thermosets can be filled or reinforced with glass. Interestingly, the thermosets can be ground to a powder and used as a source of polymer-encapsulated water.

DETAILED DESCRIPTION OF THE INVENTION

The stable water-in-resin emulsions of the invention comprise a continuous phase and water droplets emulsified within the continuous phase. The continuous phase includes an unsaturated polyetherester resin and a vinyl monomer.

By "unsaturated polyetherester resin" we mean polymer resins of intermediate molecular weight that contain ethylenic unsaturation available for free-radical polymerization with a vinyl monomer, recurring ester units, and recurring polyether blocks. The polyether blocks will have, on average, from 3 to 6 oxyalkylene (e.g., oxypropylene, oxyethylene) units. Unsaturated polyetherester resins useful in the invention are characterized by an ether/ester ratio greater than that found in conventional unsaturated polyesters. We believe that the ether blocks in these resins help to enhance the stability of emulsions made from the resins. Generally, the resins will have an ether/ester mole ratio of at least about 0.75. Preferred resins will have ether/ester mole ratios within the range of about 1 to about 3. The resins, which will have alcohol or carboxylic acid end groups, will generally have number average molecular weights within the range of about 500 to about 10,000.

Suitable unsaturated polyetherester resins can be prepared by condensation polymerization using techniques that are commonly known for making unsaturated polyester resins. The invention requires a polyetherester resin, however, so one or more polyoxyalkylene compounds must be included to produce a resin that has polyether blocks having an average of from 3 to 6 oxyalkylene units. A suitable unsaturated polyetherester resin for use in the emulsions of the invention can be made, for example, by reacting maleic anhydride (35 wt. %), a polyoxypropylene diol of 400 molecular weight (43 wt. %), and propylene glycol (22 wt. %) to produce an unsaturated polyetherester resin having a number average molecular weight of about 2000, an average of 3 oxyalkylene units in the polyether block, and ether/ester ratio of 1.

Preferred unsaturated polyetherester resins for making the emulsions of the invention are made by insertion of an anhydride or a carboxylic acid into carbon-oxygen bonds of a polyether to produce the unsaturated polyetherester resin. These resins will have polyether blocks having, on average, from 3 to 6 oxyalkylene units, and ether/ester ratios of at least about 1 as described above. Earlier, we found that polyethers react with cyclic anhydrides in the presence of a Lewis acid by such an insertion process to make polyetherester resins. This process, which is well-suited for making unsaturated polyetherester resins useful in the invention, is described in U.S. Pat. No. 5,319,006, the teachings of which are incorporated herein by reference.

Another related way to make unsaturated polyetherester resins useful in the emulsions of the invention is to use a protic acid that has a pKa less than about 0 or a metal salt of the protic acid to catalyze the insertion of an anhydride or a carboxylic acid into a polyether. These methods are described in copending appl. Ser. No. 08/220,149, filed Mar. 30, 1994, now allowed, and in copending appl. Ser. No. 08/228,845, filed Apr. 18, 1994, now allowed. Each of these methods is described in more detail below.

Polyethers used to make the unsaturated polyetherester resins are described in detail in U.S. Pat. No. 5,319,006, the teachings of which are incorporated herein by reference. Generally, it is preferred to use a polyether polyol. Suitable polyether polyols include, for example, polyoxypropylene polyols, polyoxyethylene polyols, ethylene oxide-propylene oxide copolymers, and the like. Typically, these polyols will have average hydroxyl functionalities from about 2 to about 8 and number average molecular weights from about 250 to about 10,000.

An anhydride and/or a carboxylic acid reacts with the polyether in the presence of an insertion catalyst to make an unsaturated polyetherester resin useful in the invention. Suitable anhydrides are cyclic anhydrides, and preferably at least some unsaturated anhydride is included. Examples of suitable anhydrides include, for example, maleic anhydride, succinic anhydride, phthalic anhydride, and the like. Maleic anhydride is preferred. Additional examples of suitable anhydrides appear in U.S. Pat. No. 5,319,006. Carboxylic acids useful in the making the unsaturated polyetheresters are saturated and unsaturated aliphatic and aromatic dicarboxylic acids. Examples include adipic acid, isophthalic acid, maleic acid, fumaric acid, sebacic acid, citraconic acid, and the like. Additional examples of suitable dicarboxylic acids are described in copending appl. Ser. No. 08/228,845. To make an unsaturated polyetherester resin, it is necessary that at least some of either the anhydride or carboxylic acid component have ethylenic unsaturation.

Unsaturated polyetherester resins useful in the invention are preferably made by reacting a polyether with an anhydride or a carboxylic acid in the presence of a catalyst (an "insertion catalyst") that promotes random insertion of the anhydride or carboxylic acid into the polyether. Suitable insertion catalysts include Lewis acids, protic acids that have a pKa less than about 0, and metal salts of the protic acids. The insertion catalyst is used in an amount effective to promote random insertion of either the anhydride or the carboxylic acid into carbon-oxygen bonds of the polyether to produce a polyetherester resin.

Preferred Lewis acids are metal halides of the formula $MX_n$, wherein M is a metal having an oxidation number from 2 to 4, X is a halogen, and n is an integer from 2 to 4. Examples of suitable Lewis acids are zinc chloride, zinc bromide, stannous chloride, stannous bromide, aluminum chloride, ferric chloride, boron trifluoride, and the like, and mixtures thereof. Most preferred are zinc chloride and zinc bromide. When a Lewis acid catalyst is used, it is preferred to use an amount within the range of about 0.01 to about 5 wt. % based on the amount of polyether. Additional examples of suitable Lewis acids are found in U.S. Pat. No. 5,319,006, the teachings of which are incorporated herein by reference.

Protic acids (organic and inorganic) that have a pKa less than about 0 are also useful as insertion catalysts. Generally, the acids will be stronger than organic carboxylic acids. Suitable acids include arylsulfonic acids, alkylsulfonic acids, and halogenated alkyl- and arylsulfonic acids. Also suitable are hydrogen halides, halosulfonic acids, tetrafluoroboric acid, heteropolyacids, and sulfuric acid. Mixtures of different acids can be used. Examples include p-toluenesulfonic acid, trifluoromethanesulfonic acid (triflic acid), trichloromethanesulfonic acid, hydrochloric acid, phosphotungstic acid, and the like. Preferred protic acids are sulfuric acid, p-toluenesulfonic acid, and phosphotungstic acid. When a protic acid is used as the catalyst, it is generally preferred to use an amount within the range of about 0.01 to about 1 wt. % based on the amount of polyether. A more preferred range is from about 0.01 to about 0.3 wt. %. Additional examples of suitable protic acids are found in appl. Ser. No. 08/220,149, filed Mar. 30, 1994, now allowed, the teachings of which are incorporated herein by reference.

Metal salts derived from protic acids that have a pKa less than about 0 are also effective insertion catalysts. Preferred salts are metal salts of arylsulfonic acids, alkylsulfonic acids, halogenated aryl- and alkylsulfonic acids, tetrafluoroboric acid, sulfuric acid, heteropolyacids, and halosulfonic acids. Sulfonic acid salts, especially triflate salts, are particularly preferred. Preferably, the metal is selected from Group IA, IIA, IIB, IB, IIIA, IVA, VA, and VIII. Thus, the metal can be, for example, lithium, potassium, magnesium, zinc, copper, aluminum, tin, antimony, iron, nickel. Examples of suitable metal salts are lithium triflate, sodium triflate, magnesium triflate, zinc triflate, copper(II) triflate, zinc tetrafluoroborate, zinc p-toluenesulfonate, aluminum triflate, iron(II) tetrafluoroborate, tin(II) triflate, and the like, and mixtures thereof. When a metal salt is used as the catalyst, it is preferably used in an amount within the range of about 1 part per million ($10^4$ wt. %) to about 1 wt. % based on the amount of polyether. A more preferred range is from about 0.01 wt. % to about 0.3 wt. %. Additional examples of suitable metal salts of protic acids are found in appl. Ser. No. 08/220,149, filed Mar. 30, 1994, now allowed, the teachings of which are incorporated herein by reference.

The unsaturated polyetherester resins used in the emulsions preferably have an acid number less than about 80 mg KOH/g, more preferably less than about 60 mg KOH/g. The resins preferably have number average molecular weights within the range of about 500 to about 5000, more preferably from about 1000 to about 3000. Particularly stable emulsions can be made with unsaturated polyetherester resins that have an acid number less than about 50 mg KOH/g and a number average molecular weight greater than about 1800.

The unsaturated polyetherester resin is preferably the only resin component. However, if desired, one can blend in any amount of an unsaturated polyester resin. The blends will generally give more stable emulsions compared with emulsions made only with a polyester resin because of the presence of at least some amount of polyetherester resin in the blend. Blending may be desirable for optimizing cost, performance of the emulsion, or thermoset physical properties.

The unsaturated polyetherester resins described above form one part of the continuous phase of the stable water-in-resin emulsions of the invention. The second required component of the continuous phase is a vinyl monomer. Vinyl monomers are compounds that have terminal ethylenic unsaturation and which react under free-radical conditions with an unsaturated polyetherester resin. Suitable vinyl monomers include, but are not limited to, vinyl aromatic monomers, vinyl esters of carboxylic acids, acrylic and methacrylic acid esters, allyl esters of aromatic di- and polycarboxylic acids, and the like. Additional examples of suitable vinyl monomers appear in U.S. Pat. No. 5,319,006. Vinyl aromatic monomers and acrylic and methacrylic acid esters are preferred. Styrene is particularly preferred.

The unsaturated polyetherester resin and the vinyl monomer form the continuous phase. The continuous phase includes from about 20 to about 80 wt. % of the vinyl monomer, and from about 20 to about 80 wt. % of the unsaturated polyetherester. More preferably, the continuous phase includes from about 50 to about 70 wt. % of a vinyl monomer, and from about 30 to about 50 wt. % of an unsaturated polyetherester resin.

The stable water-in-resin emulsions comprise a discontinuous phase, emulsified within the continuous phase, of water droplets. The water droplets comprise from about 20 to about 70 wt. % of the emulsion. A more preferred range is from about 40 to about 65 wt. %. The average diameter of the water droplets in the emulsions is preferably less than about 10 microns, and is more preferably within the range of about 2 to about 6 microns.

The stable water-in-resin emulsions of the invention are prepared by methods known in the art for making water-extended polyester emulsions. A suitable method is described, for example, in R. E. Carpenter, "Water-Extended Polyesters," *Ency. Polym. Sci. Eng.* 12 (1989) 290. Suitable methods also appear in U.S. Pat. Nos. 4,077,931, 3,988,272, and 3,442,842, the teachings of which are incorporated herein by reference.

Generally, the emulsions of the invention can be made by batch or continuous machine mixing. In a typical batch process, water is slowly added to the unsaturated polyetherester resin while mixing at high shear. If mixing is inadequate or if water is added too rapidly, the emulsion may lack the desired stability, viscosity, and water droplet size.

An advantage of the polyetherester emulsions of the invention compared with conventional polyester emulsions is their generally greater stability. This is particularly true when the acid number of the polyetherester resin is less than about 60 mg KOH/g, and when the number average molecular weight of the resin is greater than about 1800. As the results in Table 1 show, polyetherester emulsions of the invention have stabilities in excess of 4 weeks, while a typical commercially available polyester emulsion is stable for less than 3 days. The polyether blocks apparently help to stabilize the polyetherester emulsions compared with polyester emulsions.

We also found that significant improvements in emulsion stability can be achieved by preparing the emulsions in the presence of a small amount of a base stabilizer. The base stabilizer is generally a water-soluble or partially water-soluble inorganic or organic base. Weak bases are preferred. The amount of base stabilizer used is generally up to about 5 wt. % based on the amount of emulsion. A preferred range is from about 0.1 to about 1 wt. %; more preferred is the range from about 0.2 to about 0.6 wt. %.

Suitable base stabilizers include alkali metal and alkaline earth metal carbonates, bicarbonates, phosphates, biphosphates, hydroxides, alkoxides, and the like, and mixtures thereof. Also included are ammonia, alkylammonium hydroxides, alkoxides, carbonates, and bicarbonates, partially water-soluble metal oxides, and the like. Particularly preferred as base stabilizers are weak inorganic bases. Specific examples of suitable base stabilizers include, but are not limited to, sodium bicarbonate, sodium carbonate, potassium methoxide, lithium hydroxide, sodium dihydrogen phosphate, disodium hydrogen phosphate, ammonia, calcium hydroxide, zinc oxide, magnesium oxide, tetramethylammonium hydroxide, trimethylammonium bicarbonate, and the like.

In the absence of the base stabilizer, the emulsions generally have lower stabilities when the polyetherester resin has a molecular weight below 1800 and/or an acid number greater than 60 mg KOH/g. When a base stabilizer is used, the polyetherester emulsions have high stabilities (greater than 2 weeks; see Examples 40–52 and Table 7) even when relatively low molecular weight (below 1800) or high acid number (>60 mg KOH/g) polyetherester resins are used.

Adding a base stabilizer to a polyetherester emulsion imparts added stability without an adverse effect on emulsion viscosity. In contrast, addition of a base to a polyester emulsion often results in an unacceptable viscosity increase. For example, the polyester emulsion of Comparative Example 5 below has a workable viscosity of 900–1200 cps. If 0.4 wt. % of ammonium hydroxide solution is added, the emulsion is difficult to make, and its viscosity increases to the unworkable value of 8500–10,000 cps. When a comparable amount of ammonium hydroxide solution is added to a polyetherester emulsion, the emulsion stability improves, and the viscosity remains workable (see Example 6).

A filler is optionally included in the polyetherester emulsions of the invention. Suitable fillers are non-reactive materials that are insoluble in both the water and organic phases of the emulsions. Suitable fillers will not interfere with the initiator system or with the emulsion stability. Neutral fillers are preferred; highly basic or acidic fillers may not be suitable. When the emulsion is to be used for casting applications, the emulsion can include up to about 30 wt. % of the filler. For other end uses, the emulsion may include up to about 70 wt. % of the filler. Suitable fillers are those generally known in the art for making filled unsaturated polyester products. These include, for example, Kaolin clay, aluminum trihydrate, metal powder, calcium carbonate, carbon, silica, titanium dioxide, magnesium silicate, glass fiber, and the like, and mixtures thereof. Physical properties of some thermosets made from filler-containing polyetherester emulsions are shown in Table 5 (Examples 28–34). Glass mat can also be used as a filler (see Examples 35–38).

The emulsions of the invention optionally include a functional additive. Suitable functional additives include neutral salts (sodium chloride, zinc sulfate, or the like), dyes, pesticides, herbicides, fertilizers, and the like. These additives may be water-soluble or dispersible in the emulsion. The amount of functional additive used is preferably within the range of about 0.1 to about 50 wt. %, and depends on the nature of the additive. In some cases, for example dyes, only a small amount of the additive will be used; other additives, such as fertilizers, are preferably used in large amounts. See Example 8.

The invention includes water-extended polyetherester thermosets. The thermosets comprise the reaction product of an emulsion of the invention and a catalyst system which comprises a free-radical initiator and a transition-metal catalyst. Typically, a catalyst system is added to the emulsion, the mixture is poured into a mold, and is cured, usually at room temperature. The thermoset is then post-cured, if desired by heating it at elevated temperature (e.g., 50° C. to 75° C.) to effect a complete cure. The procedures are essentially the same as those now used to make water-extended polyester thermosets. The techniques are taught, for example, in U.S. Pat. Nos. 4,077,931, 3,988,272, and 3,442,842, the teachings of which are incorporated herein by reference. Example 10 illustrates how to make a water-filled polyetherester thermoset of the invention.

The catalyst system comprises a free-radical initiator and a transition-metal catalyst. Suitable free-radical inititors are peroxides that are liquids or which are soluble in the polyetherester emulsion and will decompose into free-radicals in the presence of a transition-metal catalyst. Examples include hydrogen peroxide, methyl ethyl ketone peroxide, benzoyl peroxide, and the like. The free-radical initiator is used in an amount effective to promote rapid curing of the polyetherester resin and vinyl monomer. Usually, the amount of free-radical initiator used is within the range of about 0.01 to about 5 wt. %, more preferably from about 0.2 to about 2 wt. %.

The catalyst system includes a transition-metal catalyst. Suitable transition-metal catalysts are those that will promote the decomposition of the free-radical initiator, typically a peroxide, into free radicals. Useful transition-metal catalysts include those used to make water-extended polyester thermosets. Examples are described in U.S. Pat. No. 4,077,931, which is incorporated herein by reference. Suitable transition-metal catalysts are oil-soluble transition metal compounds that can dissolve in the polyetherester resin/vinyl monomer mixture and can make transition-metal ions available for promoting the free-radical curing reaction. Particularly preferred are organo-cobalt compounds, such as cobalt octoate, cobalt naphthenate, cobalt neodecanate, cobalt linoleate, or the like. The transition-metal catalyst is typically used in an amount within the range of about 0.0001 to about 5 wt. % based on the amount of emulsion.

The water-extended polyetherester thermosets of the invention have good physical properties over a wide range of water contents, and improved properties compared with commercially available water-extended polyester emulsions (see Tables 2–4 for a comparison of physical properties). As the examples below show, the thermosets can be filled (see Examples 28–34) or reinforced with glass (see Examples 35–38). Interestingly, the thermosets can be ground to a powder (see Example 12) and used as a source of polymer-encapsulated water. This provides a vehicle for products such as slow-release fertilizers (see Example 8), herbicides, pesticides, and the like.

The following examples merely illustrate the invention. Those skilled in the art will recognize many variations that are within the spirit of the invention and scope of the claims.

EXAMPLE A

Preparation of a Polyetherester Resin by Insertion of Maleic Anhydride into a Polyether Diol A five-liter resin kettle is charged with a polyoxypropylene diol (2000 mol. wt., 2600 g, 65 wt. %), maleic anhydride (1400 g, 35 wt. %), and p-toluenesulfonic acid (4.0 g). The mixture is heated under nitrogen to 185° C. over 1–2 h. Heating continues at 185° C. until the acid number drops to about 120 mg KOH/g, which takes about 10 h. Propylene glycol (318 g) is added, and heating continues. About 4 h after the glycol is added, the acid number reaches 60 mg KOH/g. The mixture is heated under vacuum (5–20 mm Hg) for 1 h at 185° C. or until the acid number drops to 50 mg KOH/g or less. The resin is allowed to cool to about 100° C., and is then blended with styrene (50 wt. %) that contains methylhydroquinone (150 ppm) and tert-butylcatechol (50 ppm) inhibitors.

EXAMPLE B

Preparation of a Polyetherester Resin by Insertion of Maleic Anhydride into a Polyether Triol The procedure of Example A is followed, except that a polyoxypropylene triol having a number average molecular weight of about 3000 is used in place of the polyoxypropylene diol.

EXAMPLE C

Preparation of a Polyetherester Resin by Esterification

A two-liter resin kettle is charged with a polyoxypropylene diol (400 mol. wt., 685 g), propylene glycol (355 g), and maleic anhydride (560 g, 35 wt. %). The mixture is heated under nitrogen to 195° C. over 3–4 h. Heating continues at 195° C. until more than 90% of the expected water of reaction is collected, or until the acid number drops to about 40 mg KOH/g, which takes about 15–20 h. The mixture is heated under vacuum (5–20 mm Hg) for 2 h at 195° C. or until the acid number drops to 20 mg KOH/g or less. The resin is allowed to cool to about 100° C., and is then blended with styrene (50 wt. %) that contains methylhydroquinone (150 ppm) and tert-butylcatechol (50 ppm) inhibitors.

EXAMPLE D

Preparation of a Polyetherester Resin by Esterification

The procedure of Example C is followed using 30 wt. % polyoxypropylene diol (400 mol. wt.), 24 wt. % of dipropylene glycol, and 35 wt. % of maleic anhydride.

EXAMPLES 1–4

Preparation of Stable Water-in-Resin Emulsions from Polyetherester Resins

The polyetherester resin solution (50% resin) of Example A (100 g) is mixed with 0.1 to 0.75 wt. % cobalt octoate (12% cobalt), and is placed in a polypropylene container. While agitating the resin with a high-shear mixer at 2000 rpm, distilled water (100 g) is slowly added. The blades of the mixer have moderate pitch to minimize air entrapment. The addition rate of water is kept slow enough to avoid the presence of free water on the surface of the emulsion. After water addition is complete, the emulsion is mixed for an additional 2–3 min. The emulsion is allowed to stand for 30 min. before use to allow trapped air to escape. It may be stored in the plastic container under nitrogen. This emulsion is stable for at least two weeks.

The same procedure is followed to make water-in-resin emulsions from the polyetherester resins of Examples B, C, and D. In each case, a stable emulsion is obtained. Emulsion stabilities are shown in Table 1.

COMPARATIVE EXAMPLE 5

Preparation of a Water-in-Resin Emulsion from a Commercial Polyester Resin

The procedure of Example 1 is used to prepare a water-in-resin emulsion from AROPOL WEP-662P resin, a commercial polyester resin available from Ashland Chemical, Inc., except that cobalt octoate is not added (the resin as supplied already includes the cobalt compound). The emulsion remains stable for less than three days.

Examples 1–4 and Comparative Example 5 show the improved stability of emulsions made using polyetherester resins compared with commercial polyester resins.

EXAMPLE 6

Preparation of a Stable Water-in-Resin Emulsion from a Polyetherester Resin: Emulsion Prepared in the Presence of a Water-Soluble Weak Base The procedure of Example 1 is followed, except that an aqueous solution containing 0.01 to 0.4 wt. % of ammonia is used in place of distilled water. The emulsion is stable for at least four weeks. This emulsion may be filled with Kaolin clay as described below (Examples 31–34). It can also be used for making glass-reinforced laminate products (Examples 35–38) without phase separation during preparation of the laminates.

EXAMPLE 7

Preparation of a Stable Water-in-Resin Emulsion from a Polyetherester Resin: Emulsion Prepared in the Presence of a Water-Insoluble Weak Base The procedure of Example 1 is followed, except that an aqueous dispersion of zinc oxide (1.0 g of ZnO in 100 g of water) is used in place of distilled water. The emulsion is stable for at least 2 weeks.

EXAMPLE 8

Preparation of a Stable Water-in-Resin Emulsion from a Polyetherester Resin: Emulsion Prepared in the Presence of a Water-Soluble Inorganic Salt The procedure of Example 1 is followed, except that a saturated aqueous solution of sodium chloride, potassium chloride, or MIRACLE GRO fertilizer (product of Stern's Miracle Gro Products, Inc.) is used in place of distilled water. The resulting water-in-resin emulsion is stable for at least 2 weeks.

EXAMPLE 9

Preparation of a Stable Water-in-Resin Emulsion from a Polyetherester Resin: Emulsion Prepared in the Presence of a Solid Filler The procedure of Example 6 is followed to make a water-in-resin emulsion that contains 0.5 wt. % of ammonium hydroxide (30% $NH_3$). Kaolin clay (20 wt. %) is slowly added to the emulsion with high-shear mixing at 2000 rpm. The resulting filled emulsion is stable for at least 2 weeks. Similar results are achieved when aluminum trihydrate (20 wt. %) is used in place of the Kaolin clay.

EXAMPLE 10

Preparation of a Water-Filled Polyetherester Thermoset

The emulsion of Example 1 is mixed with 0.5–1.0 wt. % methyl ethyl ketone peroxide solution. The mixture is poured into a mold, and is cured at room temperature. If needed, the thermoset is post-cured by heating it at 50°–75° C. for 2 h. The thermoset product contains about 50 wt. % water. This product loses less than 6 wt. % of water after applying a high vacuum (2 mm Hg) at 100° C. for 1.2 h. The thermoset is self-extinguishing when exposed to a flame. The sample passes the UL-94 V-1 burning test.

EXAMPLE 11

Preparation of a Glass-Reinforced Polyetherester Thermoset Laminate

A water-in-resin emulsion is prepared as in Example 1. The emulsion is stabilized by adding 0.5 wt. % of aqueous ammonium hydroxide solution (30% $NH_3$). Laminate panels are made using a conventional hand lay-up technique. The laminate consists of three plies of 1.5 oz/ft$^2$ chopped strand mat. The laminate is cured at 55° C. for 4 h.

EXAMPLE 12

Preparation of Polyetherester Thermoset Powder Containing Encapsulated Water

A water-filled polyetherester thermoset is prepared as described in Example 10. The cured product is cooled with dry ice, and is fed to a laboratory-scale mill. While keeping the mill cool (<10° C.), the polyetherester thermoset is ground to a powder (60–80 mesh). The powder contains 39 wt. % of water.

EXAMPLES 13–17 and COMPARATIVE EXAMPLES 18–19

Comparison of Thermoset Properties: Cured Castings

The procedures of Examples 1–4 and Comparative Example 5 are followed to make water-in-resin emulsions containing 50 to 65 wt. % of water. The polyetherester resins of Examples A–D are compared with AROPOL WEP 662P, a commercially available polyester resin. The thermosets are prepared as described in Example 10. Physical properties of the cured castings appear in Table 2.

EXAMPLES 20–23

Polyetherester Thermosets: Effect of Water Content on Physical Properties

The procedure of Example 1 is generally followed to make water-in-resin emulsions that contain from 10 to 65 wt. % of water. Thermosets are prepared using the procedure of Example 10. Physical properties of the polyetherester thermosets appear in Table 3.

EXAMPLES 24–27

Polyetherester Thermosets: Effect of Resin/Vinyl Monomer Ratio on Physical Properties The procedure of Example 1 is generally followed to make water-in-resin emulsions containing 50 wt. % water, but the polyetherester resin to styrene ratio is varied as is shown in Table 4. Thermosets are prepared using the procedure of Example 10. Physical properties of the polyetherester thermosets appear in Table 4.

EXAMPLES 28–30

Aluminum Trihydrate-Filled Polyetherester Thermosets

The procedure of Example 1 is followed to make water-in-resin emulsions containing 50 wt. % water. Aluminum trihydrate (amount shown in Table 5) is slowly added to the emulsion with high-shear mixing at 2000 rpm. A thermoset is prepared from the filled emulsion as described in Example 10. Physical properties of the filled thermoset appear in Table 5.

EXAMPLES 31–34

Kaolin Clay-Filled Polyetherester Thermosets

The procedure of Example 1 is followed to make water-in-resin emulsions containing 50 wt. % water. Zinc oxide (0.5 wt. %) is added to stabilize the emulsion. Kaolin clay (amount shown in Table 5) is slowly added to the emulsion with high-shear mixing at 2000 rpm. A thermoset is prepared from the filled emulsion as described in Example 10. Physical properties of the filled thermoset appear in Table 5.

EXAMPLES 35–38

Glass-Reinforced Polyetherester Thermosets

The procedure of Example 6 is followed to make a water-in-resin emulsion that contains 0.5 wt. % of aqueous ammonium hydroxide (30% $NH_3$). Laminate panels about 0.07 to 0.08 inches thick consisting of three plies of glass mat are prepared as described in Example 11. Physical properties of the glass-reinforced polyetherester thermosets appear in Table 6.

EXAMPLES 39–52

Preparation of Base-Stabilized Water-in-Resin Emulsions from Polyetherester Resins and Thermosets from the Emulsions The procedure of Example 1 is generally followed, except that a small amount (0.05 to 5 wt. %) of a base (see Table 7) is dissolved or dispersed in the aqueous phase before it is added to the polyetherester resin. Viscosities of the base-stabilized emulsions appear in Table 7. Each emulsion of the invention is stable for at least 2 weeks. Polyetherester thermosets are made from the emulsions using the procedure of Example 10. Physical properties of the thermosets appear in Table 7.

The preceding examples are meant only as illustrations; the following claims define the invention.

TABLE 1

Comparison of Emulsion Stabilities

| Ex # | Resin | Type | Prepared by | Ether/Ester ratio | Stability |
|---|---|---|---|---|---|
| 1 | A | Polyetherester* | Insertion | 1 | >4 weeks |
| 2 | B | Polyetherester | Insertion | 1 | >4 weeks |
| 3 | C | Polyetherester | Esterification | 1 | >4 weeks |
| 4 | D | Polyetherester | Esterification | 1 | >4 weeks |
| C5 | — | Polyester** | — | 0 | <3 days |

*Polyetherester resins A–D have acid numbers less than 50 mg KOH/g and number average mol wts. > 1800.
**AROPOL WEP 662 polyester resin (product of Ashland Chemicals, Inc., recommended for use in water-extended polyester emulsions).

TABLE 2

Physical Properties of Polyetherester Thermosets

| | | | Thermoset Physical Properties | | | | |
|---|---|---|---|---|---|---|---|
| Ex # | Resin | Water (wt. %) | Tensile strength (psi) | Tensile modulus (kpsi) | Elongation (%) | Flexural strength (psi) | Flexural modulus (kpsi) |
| 13 | Polyetherester | 50 | 2200 | 115 | 5–10 | 4000 | 140 |
| 14 | (Ex A) | 65 | 1250 | 58 | 4.3 | 2500 | 71 |
| 15 | Polyetherester (Ex B) | 50 | 2050 | 109 | 6 | 3730 | 121 |
| 16 | Polyetherester (Ex C) | 50 | 1530 | 100 | 3 | 3050 | 116 |
| 17 | Polyetherester (Ex D) | 50 | 1950 | 107 | 3 | 3410 | 109 |
| C18 | AROPOL WEP | 50 | 1600 | 100 | 3.5 | 2800 | 98 |
| C19 | 662P polyester resin | 60 | 750 | 56 | 5.0 | 1300 | 55 |

TABLE 3

Physical Properties of Polyetherester Thermosets: Effect of Water Content

| | | | Thermoset Physical Properties | | | | |
|---|---|---|---|---|---|---|---|
| Ex # | Resin | Water (wt. %) | Tensile strength (psi) | Tensile modulus (kpsi) | Elongation (%) | Flexural strength (psi) | Flexural modulus (kpsi) |
| 20 | Polyetherester | 10 | 4050 | 246 | 2.9 | 8130 | 277 |
| 21 | (Ex A) | 25 | 3270 | 185 | 8.5 | 6260 | 212 |
| 22 | | 50 | 2290 | 115 | 8.1 | 3990 | 128 |
| 23 | | 65 | 1270 | 58 | 4.3 | 2540 | 71 |

TABLE 4

Polyetherester Thermosets: Effect of Resin/Vinyl Monomer Ratio on Physical Properties

| | | | Thermoset Physical Properties | | | | |
|---|---|---|---|---|---|---|---|
| Ex # | Resin | Resin/Styrene Ratio (wt/wt) | Tensile strength (psi) | Tensile modulus (kpsi) | Elongation (%) | Flexural strength (psi) | Flexural modulus (kpsi) |
| 24 | Polyetherester | 65/35 | 864 | 81 | 2.0 | 2460 | 86 |
| 25 | (Ex A) | 60/40 | 1540 | 83 | 4.0 | 2370 | 99 |
| | | 50/50 | 2060 | 102 | 6.0 | 3620 | 120 |
| | | 35/65 | 2050 | 108 | 8.0 | 3630 | 121 |

TABLE 5

Physical Properties of Filled Polyetherester Thermosets

| | | | Thermoset Physical Properties | | | | |
|---|---|---|---|---|---|---|---|
| Ex # | Filler | Wt. % Filler | Tensile strength (psi) | Tensile modulus (kpsi) | Elongation (%) | Flexural strength (psi) | Flexural modulus (kpsi) |
| 28 | Aluminum | 0 | 2380 | 139 | 7.0 | 4320 | 175 |
| 29 | trihydrate | 20 | 2270 | 207 | 3.0 | 3990 | 212 |
| 30 | | 30 | 2130 | 307 | 2.0 | 4320 | 236 |
| 31 | Kaolin clay | 0 | 2050 | 109 | 6.0 | 3730 | 121 |

TABLE 5-continued

Physical Properties of Filled Polyetherester Thermosets

| Ex # | Filler | Wt. % Filler | Tensile strength (psi) | Tensile modulus (kpsi) | Elongation (%) | Flexural strength (psi) | Flexural modulus (kpsi) |
|---|---|---|---|---|---|---|---|
| 32 | | 5 | 1770 | 125 | 3.0 | 3640 | 132 |
| 33 | | 10 | 2030 | 137 | 4.0 | 4000 | 146 |
| 34 | | 20 | 2060 | 189 | 2.0 | 3600 | 192 |

TABLE 6

Physical Properties of Glass-Reinforced Polyetherester Thermosets

| Ex # | Thickness (in) | Glass Mat (wt. %) | Tensile strength (psi) | Tensile modulus (kpsi) | Elongation (%) | Flexural strength (psi) | Flexural modulus (kpsi) |
|---|---|---|---|---|---|---|---|
| 35 | 0.074 | 55 | 14.2 | 1150 | 1.6 | 11.4 | 991 |
| 36 | 0.070 | 51 | 13.2 | 1190 | 1.5 | 10.1 | 747 |
| 37 | 0.078 | | 14.7 | 1360 | 1.7 | 9.4 | 607 |
| 38 | 0.071 | | 18.6 | 1345 | 1.7 | 17.3 | 1210 |

TABLE 7

Physical Properties of Thermosets made using Base-Stabilized Polyetherester Emulsions

| Ex # | Base | Amount (wt. %) | Viscosity (cps) | Tensile strength (psi) | Tensile modulus (kpsi) | Elongation (%) | Flexural strength (psi) | Flexural modulus (kpsi) |
|---|---|---|---|---|---|---|---|---|
| C39* | none | — | 540 | 680 | 32 | 8 | 1410 | 50 |
| 40 | Na$_2$HPO$_4$ | 5.0 | | 1330 | 120 | 1 | 4010 | 154 |
| 41 | | 2.5 | | 1910 | 114 | 3 | 3790 | 139 |
| 42 | | 1.3 | | 2350 | 124 | 10 | 4210 | 143 |
| 43 | NaHCO$_3$ | 1.3 | 1650 | 2080 | 112 | 6 | 4030 | 139 |
| 44 | | 0.5 | 910 | 2240 | 114 | 8 | 4000 | 130 |
| 45 | Na$_2$CO$_3$ | 0.5 | 870 | 2040 | 117 | 4 | 4430 | 146 |
| 46 | | 0.25 | 660 | 2160 | 113 | 7 | 3860 | 125 |
| 47 | MgO | 0.05 | 540 | 1547 | 86 | 7 | 2820 | 92 |
| 48 | | 0.1 | 550 | 1950 | 101 | 8 | 3590 | 117 |
| 49 | | 0.25 | 750 | 2020 | 116 | 6 | 4030 | 141 |
| 50 | | 0.5 | 3300 | 1260 | 100 | 4 | 2780 | 97 |
| 51 | ZnO | 0.5 | 2080 | 2160 | 118 | 5 | 3990 | 127 |
| 52 | Ca(OH)$_2$ | 0.5 | 2540 | 2060 | 120 | 5 | 4110 | 141 |

*Molecular weight < 1500; acid number 60 mg KOH/g.

We claim:

1. A stable water-in-resin emulsion which comprises a continuous phase and water droplets emulsified within the continuous phase; wherein the continuous phase includes from about 20 to about 80 wt. % of a vinyl monomer, and from about 20 to about 80 wt. % of an unsaturated polyetherester resin, both amounts based on the amount of continuous phase; wherein the unsaturated polyetherester resin is made by reacting a polyether and an anhydride or dicarboxylic acid in the presence of a catalyst effective to promote insertion of the anhydride or dicarboxylic acid into carbon-oxygen bonds of the polyether to produce the unsaturated polyetherester resin; and wherein the water droplets comprise from about 20 to about 70 wt. % of the emulsion.

2. The emulsion of claim 1 wherein the unsaturated polyetherester resin has an acid number less than about 50 mg KOH/g and a number average molecular weight greater than about 1800, and the emulsion is stable for more than about 4 weeks.

3. The emulsion of claim 1 containing up to about 5 wt. % of a base stabilizer.

4. The emulsion of claim 3 wherein the base stabilizer is selected from the group consisting of ammonia; alkylammonium hydroxides, alkoxides, carbonates, and bicarbonates; partially water-soluble metal oxides; and alkali metal and alkaline earth metal carbonates, bicarbonates, phosphates, biphosphates, hydroxides, and alkoxides.

5. The emulsion of claim 1 wherein the vinyl monomer is styrene.

6. The emulsion of claim 1 wherein the continuous phase includes from about 50 to about 70 wt. % of the vinyl monomer, and from about 30 to about 50 wt. % of the unsaturated polyetherester resin.

7. The emulsion of claim 1 wherein the water droplets comprise from about 40 to about 65 wt. % of the emulsion.

8. The emulsion of claim 1 which comprises up to about 30 wt. % of a filler selected from the group consisting of Kaolin clay, aluminum trihydrate, metal powder, calcium carbonate, carbon, silica, titanium dioxide, and magnesium silicate, and glass fibers.

9. The emulsion of claim 1 which further comprises a functional additive selected from the group consisting of neutral salts, dyes, pesticides, herbicides, and fertilizers.

10. The emulsion of claim 1 wherein the average diameter of the water droplets is within the range of about 2 to about 6 microns.

11. A stable water-in-resin emulsion which comprises a continuous phase and water droplets emulsified within the continuous phase; wherein the continuous phase includes from about 50 to about 70 wt. % of a vinyl monomer, and from about 30 to about 50 wt. % of an unsaturated polyetherester resin, both amounts based on the amount of continuous phase; wherein the unsaturated polyetherester resin is made by reacting a polyether and an anhydride or dicarboxylic acid in the presence of a catalyst effective to promote insertion of the anhydride or dicarboxylic acid into carbon-oxygen bonds of the polyether to produce the unsaturated polyetherester resin; and wherein the water droplets comprise from about 20 to about 70 wt. % of the emulsion.

12. The emulsion of claim 11 wherein the unsaturated polyetherester resin has an acid number less than about 50 mg KOH/g and a number average molecular weight greater than about 1800, and the emulsion is stable for more than about 4 weeks.

13. The emulsion of claim 11 containing up to about 5 wt. % of a base stabilizer selected from the group consisting of ammonia; alkylammonium hydroxides, alkoxides, carbonates, and bicarbonates; partially water-soluble metal oxides; and alkali metal and alkaline earth metal carbonates, bicarbonates, phosphates, biphosphates, hydroxides, and alkoxides.

14. The emulsion of claim 11 wherein the vinyl monomer is styrene.

15. The emulsion of claim 11 wherein the water droplets comprise from about 40 to about 65 wt. % of the emulsion.

16. The emulsion of claim 11 which comprises up to about 30 wt. % of a filler selected from the group consisting of Kaolin clay, aluminum trihydrate, metal powder, calcium carbonate, carbon, silica, titanium dioxide, and magnesium silicate, and glass fibers.

17. The emulsion of claim 11 which further comprises a functional additive selected from the group consisting of neutral salts, dyes, pesticides, herbicides, and fertilizers.

18. The emulsion of claim 11 wherein the average diameter of the water droplets is within the range of about 2 to about 6 microns.

19. A stable water-in-resin emulsion which comprises a continuous phase and water droplets emulsified within the continuous phase; wherein the continuous phase includes from about 50 to about 70 wt. % of styrene, and from about 30 to about 50 wt. % of an unsaturated polyetherester resin, both amounts based on the amount of continuous phase; wherein the unsaturated polyetherester resin is made by reacting a polyether and an anhydride or dicarboxylic acid in the presence of a catalyst effective to promote insertion of the anhydride or dicarboxylic acid into carbon-oxygen bonds of the polyether to produce the unsaturated polyetherester resin; and wherein the water droplets comprise from about 40 to about 65 wt. % of the emulsion.

* * * * *